US012812508B2

(12) United States Patent
Cakulev et al.

(10) Patent No.: US 12,812,508 B2
(45) Date of Patent: Nov. 24, 2026

(54) SYSTEMS AND METHODS FOR DYNAMIC PER-SLICE CAPACITY THRESHOLDS IN A WIRELESS NETWORK

(71) Applicant: Verizon Patent and Licensing Inc., Basking Ridge, NJ (US)

(72) Inventors: Violeta Cakulev, Milburn, NJ (US); Lixia Yan, Basking Ridge, NJ (US); Raquel Morera Sempere, Weehawken, NJ (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 279 days.

(21) Appl. No.: 18/653,269

(22) Filed: May 2, 2024

(65) Prior Publication Data

US 2025/0344132 A1 Nov. 6, 2025

(51) Int. Cl.

*H04W 48/06* (2009.01)
*H04W 24/08* (2009.01)
*H04W 48/18* (2009.01)

(52) U.S. Cl.

CPC .......... *H04W 48/06* (2013.01); *H04W 24/08* (2013.01); *H04W 48/18* (2013.01)

(58) Field of Classification Search

None

See application file for complete search history.

(56) References Cited

U.S. PATENT DOCUMENTS

2024/0236832 A1* 7/2024 Suh .................... H04W 48/18
2025/0097747 A1* 3/2025 Bhangu ................ H04B 17/309
2025/0113285 A1* 4/2025 Shen ................... H04W 60/00

* cited by examiner

*Primary Examiner* — Anh Ngoc M Nguyen

(57) ABSTRACT

A system described herein, which may be implemented by a Network Slice Admission Control Function ("NSACF") of a wireless network, may monitor analytics information with respect to a plurality of network slices of a wireless network. The analytics information may be received from a Network Data Analytics Function ("NWDAF") of the wireless network. The system may determine, based on the monitored analytics information, a capacity threshold for at least a particular network slice. The system may receive a request for access to the particular network slice; determine, based on the capacity threshold for the particular network slice, whether to accept or deny the request; and output, in response to the request, an indication of whether the request is accepted or denied. The indication may be provided to a network function of the wireless network or to an external device via a Network Exposure Function ("NEF").

20 Claims, 9 Drawing Sheets

SYSTEMS AND METHODS FOR DYNAMIC PER-SLICE CAPACITY THRESHOLDS IN A WIRELESS NETWORK

BACKGROUND

Wireless networks provide wireless connectivity to User Equipment ("UEs"), such as mobile telephones, tablets, Internet of Things ("IoT") devices, Machine-to-Machine ("M2M") devices, or the like. Wireless networks may include multiple network slices, where each network slice is associated with a respective set of Quality of Service ("QoS") parameters, Service Level Agreements ("SLAs"), performance thresholds, or the like. Each network slice may exhibit its own set of load metrics, such as an amount of UEs that are connected to the wireless network and are authorized to access services via a given slice, or an amount of communication sessions (e.g., protocol data unit ("PDU") sessions) that are active via a given slice.

DETAILED DESCRIPTION OF EXAMPLE EMBODIMENTS

The following detailed description refers to the accompanying drawings. The same reference numbers in different drawings may identify the same or similar elements.

Wireless networks may implement network slice access control mechanisms whereby access to different network slices may be selectively granted or denied based on factors such as capacity thresholds associated with each respective network slice. Capacity thresholds for a particular network slice may be specified in terms of quantity of UEs (e.g., UEs that are connected to the wireless network and are authorized to access the wireless network via the particular network slice), quantity of PDU sessions that are associated with the particular network slice, a combination thereof, and/or other suitable factors.

A wireless network may include a Network Slice Admission Control Function ("NSACF") or other suitable device, system, or network function that performs access control mechanisms with respect to one or more network slices. For example, an NSACF may receive a request (e.g., from another NF such as an Access and Mobility Management Function ("AMF"), a Session Management Function ("SMF"), or the like) for access to a particular network slice. The request may be associated with, for example, one or more UEs, one or more PDU sessions, or one or more other parameters. For example, the request may be received from an AMF, based on the AMF receiving a request by a given UE to connect to the wireless network. As another example, the request may be received from an SMF, based on the SMF receiving a request to establish or modify one or more PDU sessions for a given UE. The NSACF may determine whether to grant or deny a request for access to a given network slice based on factors such as whether the network slice has adequate capacity to support additional traffic, while still maintaining QoS parameters, SLAs, performance thresholds, etc. associated with the network slice.

As discussed below, an NSACF may determine respective capacity thresholds for different network slices based on monitoring analytics information (e.g., Key Performance Indicators ("KPIs"), performance metrics, etc.) associated with the network slices and/or other factors. In this manner, the capacity thresholds may be based on real-world, actual performance metrics, thus enhancing the overall efficiency of the network without degrading the performance provided by the different network slices.

Figure 1:
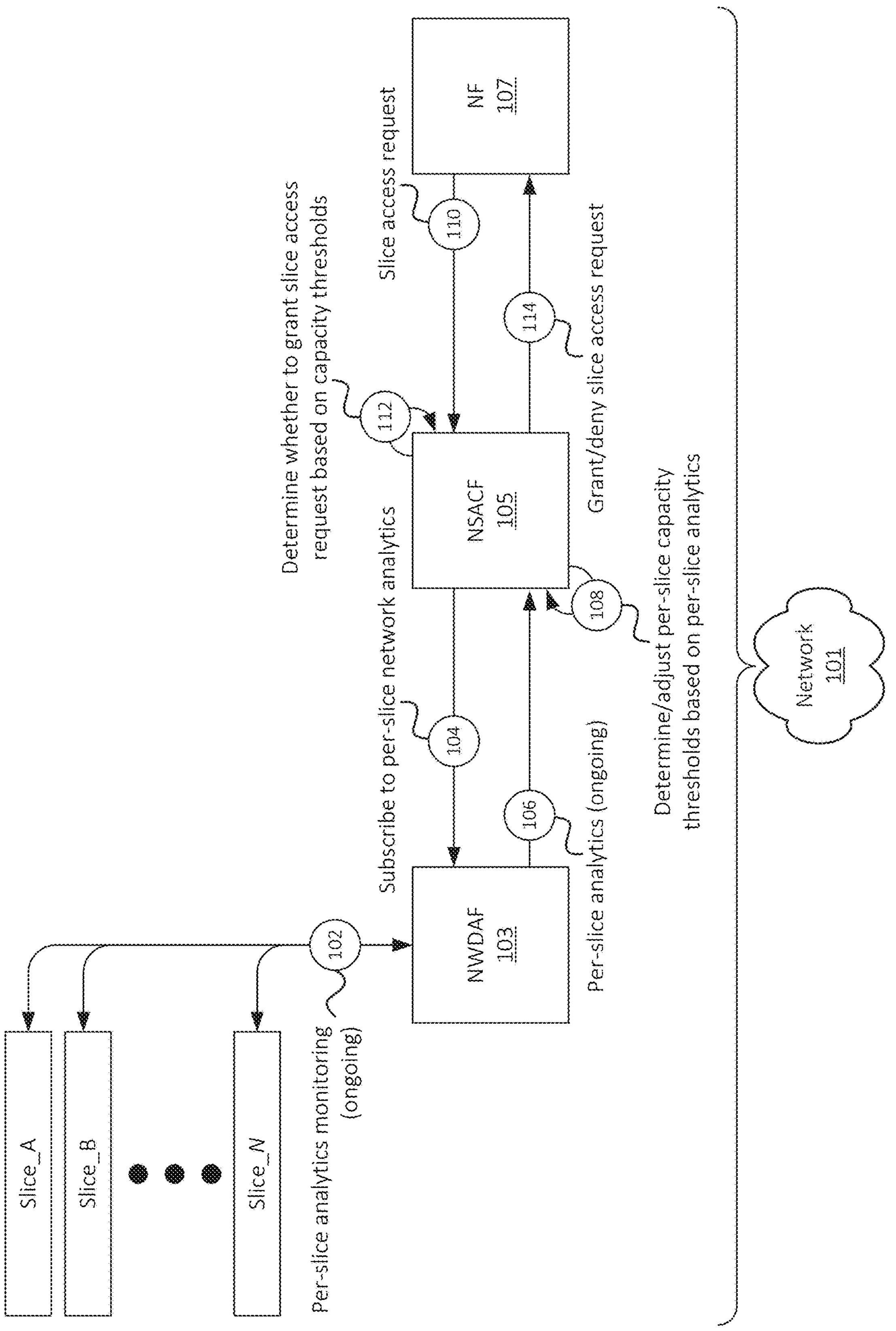
FIG. 1 illustrates an example overview of one or more embodiments described herein.

As shown in FIG. 1, a particular network 101 may include multiple network slices, represented as Slice_A, Slice_B, and Slice_N. In practice, network 101 may include additional or fewer network slices. Each network slice may be associated with a respective set of QoS parameters, SLAs, performance thresholds (e.g., minimum throughput, maximum latency, etc.), or the like. Each network slice may include a discrete set of network functions ("NFs"), such as separate NFs or instances of NFs. Additionally, or alternatively, a given NF may be associated with multiple network slices (e.g., may operate according to different QoS parameters, SLAs, etc. that are associated with multiple network slices).

Network 101 may maintain information indicating particular network slices that are authorized for access by one or more UEs. For example, a UE information repository of network 101 (e.g., a Unified Data Management function ("UDM"), a Unified Data Repository ("UDR"), a Home Subscriber Server ("HSS"), etc.) may maintain information indicating that a first UE is authorized to access Slice_A and Slice_B, that a second UE is authorized to access Slice_A and not Slice_B, etc.

As shown, analytics information associated with one or more network slices may be monitored (at 102) by Network Data Analytics Function ("NWDAF") 103. In some embodiments, such monitoring may be performed by one or more other suitable devices or systems. NWDAF 103 may, in some embodiments, monitor analytics information associated with each network slice on an ongoing (e.g., periodic, intermittent, real time or near-real time, etc.) basis. The analytics information may include performance information such as latency information over a particular time period (e.g., average latency over a particular time period, median latency over a particular time period, maximum latency over a particular time period, minimum latency over a particular time period, etc.), throughput information over a particular time period, or other suitable information. The analytics information may be monitored as actual values (e.g., determined or measured latency or throughput values) and/or as computed values (e.g., average values, median values, one or more scores or values that are generated via some other suitable function or operation, etc.). In some embodiments, the analytics information may include load and/or capacity information, such as amount of used or available bandwidth per slice, a measure of congestion per slice, or other suitable load and/or capacity information. As noted above, the quantity of UEs associated with a given slice may refer to a quantity of UEs that are connected to network 101 (e.g., to a RAN of network 101) and for which the slice has been indicated to the UE (e.g., during an attachment or connection procedure) as being available for access by the UE (e.g., an authorized slice indication provided to the UE by an AMF pursuant to a connection procedure).

In accordance with some embodiments, NSACF 105 may subscribe (at 104) to per-slice network analytics received or determined by NWDAF 103. For example, NSACF 105 may output a request to NWDAF 103 via a Service-Based Interface ("SBI"), such as an Nnwdaf SBI, to provide network analytics associated with particular slices of network 101, and/or with all of the slices of network 101. NWDAF 103 may accordingly provide (at 106) the monitored analytics information associated with the slices of network 101 to NSACF 105. For example, NWDAF 103 may provide such information in real time or near-real time, as such information is received or otherwise determined by NWDAF 103. NWDAF 103 may, for example, provide such information via an SBI, such as an Nnsacf SBI, to NSACF 105.

In accordance with some embodiments, NSACF 105 may dynamically determine and/or adjust per-slice capacity thresholds based on the received (at 106) per-slice analytics information. For example, NSACF 105 may determine, for a given slice, a maximum quantity of UEs, a maximum quantity of PDU sessions, and/or other capacity thresholds based on the per-slice analytics information.

As one example, NSACF 105 may receive information indicating that a particular network slice is associated with a relatively low measure of load, such as a relatively low bandwidth of traffic sent or received via the particular network slice. In some embodiments, the relatively low measure of load may be determined based on a relatively low measure of congestion via the particular slice. In some embodiments, NSACF 105 may receive information indicating that performance metrics associated with the network slice meet or exceed QoS parameters, SLAs, performance thresholds, etc. associated with the network slice. In such scenarios, NSACF 105 may determine (at 108) a relatively high capacity threshold (e.g., a relatively high quantity of allowed UEs, a relatively high quantity of allowed PDU sessions, etc.) for the network slice.

On the other hand, assume NSACF 105 receives (at 106) analytics information for a given network slice, indicating that the network slice is associated with a relatively high measure of load, relatively low performance metrics, etc. In such scenarios, NSACF 105 may determine (at 108) a relatively lower capacity threshold (e.g., a relatively low quantity of allowed UEs, a relatively low quantity of allowed PDU sessions, etc.) for the network slice. In this manner, the capacity thresholds may be determined (at 108) by NSACF 105 based on real-world, actual metrics as determined and reported by NWDAF 103, and may ultimately make more efficient use of network resources while providing a level of QoS, SLAs, etc. that are expected with respect to each network slice.

In some embodiments, adjusting (at 108) per-slice capacity thresholds may be performed in an automated manner by NSACF 105, such as via artificial intelligence/machine learning ("AI/ML") techniques or other suitable techniques. In some embodiments, the adjustment of per-slice capacity thresholds by NSACF 105 may include adjusting per-slice capacity thresholds that were initially manually specified by an owner or operator of network 101.

The per-slice capacity thresholds may be used by NSACF 105 to indicate, to other NFs of network 101, whether access to a given slice should be granted or not. For example, as shown, a particular NF 107 of network 101 may output (at 110) an access request associated with a particular network slice. In this example, the access request includes a request to access one particular network slice. In practice, similar operations may be performed with respect to a request to access multiple slices of network 101, and/or with respect to multiple requests to access one or more slices of network 101. In some embodiments, the slice access request may indicate a quantity of UEs, a quantity of PDU sessions, etc. associated with the request.

As one example, NF 107 may be or may include an AMF, Mobility Management Entity ("MME"), or other device or system that manages access to network 101. In such scenarios, the slice access request may indicate that access is being requested for a single UE or multiple UEs to access one or more network slices (e.g., that such network slices will ultimately be indicated to the UE(s) as permissible for the UE(s) to access). For example, a UE may connect (or request connection) to a RAN of network 101, and as part of the connection procedure may communicate with NF 107 (e.g., an AMF, MME, etc.) to request a list of network slices that the UE is authorized to access. As part of determining which network slices to indicate to the UE as authorized for the UE, NF 107 may communicate with a UE information repository of network 101 (e.g., a UDM, UDR, HSS, etc.) to identify which network slices are authorized for the UE as per UE information maintained by the UE information repository. NF 107 may further output (at 110) a slice access request to NSACF 105, which may include a request to access some or all of the network slices that are indicated by the UE information as authorized for the UE. For example, the request may include Network Slice Selection Assistance Information ("NSSAI") values or other suitable identifiers of the network slice(s) for which access is being requested.

As another example, NF 107 may be or may include an SMF, Serving Gateway ("SGW"), or other suitable device or system that participates in the establishment or modification of communication sessions (e.g., PDU sessions) between UEs and network 101. For example, a UE or other device or system may output a request to NF 107 (e.g., an SMF, SGW, etc.) to establish one or more PDU sessions, where such request includes an identifier (e.g., NSSAI value or other suitable identifier) of one or more network slices with which the one or more requested PDU sessions are associated.

NSACF 105 may determine (at 112) whether to grant or deny the slice access request based on the capacity thresholds associated with the respective slices for which access is being requested. For example, NSACF 105 may determine whether granting access to a given slice, for a quantity of UEs for which access is being requested, would exceed a maximum quantity of UEs indicated by the determined (at 108) capacity threshold for such slice. As another example, NSACF 105 may determine whether granting access to a given slice, for a quantity of PDU sessions for which access is being requested, would exceed a maximum quantity of PDU sessions indicated by the determined (at 108) capacity threshold for such slice.

NSACF 105 may accordingly indicate (at 114) whether the slice access request is granted or denied. NF 107 may proceed according to such indication. For example, in situations where NF 107 is, includes, or implements an AMF, the AMF may identify which network slices are authorized for a given UE that has requested access to network 101. In some situations, the network slices ultimately indicated by the AMF to the UE may be a subset (e.g., fewer than all) of the network slices indicated by the UE information repository (e.g., UDM, UDR, etc.) of network 101 as being authorized for access by the UE. For example, even if the UE is authorized to access a given slice as per UE information maintained by such UE information repository, NSACF 105 may ultimately deny access to the slice in situations where the capacity threshold for the slice is exceeded, or would be exceeded if access were granted to the UE.

As another example, in situations where NF 107 is, includes, or implements an SMF, the SMF may proceed with a requested establishment of, or modification to, a given PDU session via a given network slice when NSACF indicates (at 114) that access to such slice is granted. On the other hand, the SMF may forgo establishing or modifying a PDU session via a given network slice when NSACF indicates (at 114) that access to such slice is denied.

Figure 2:
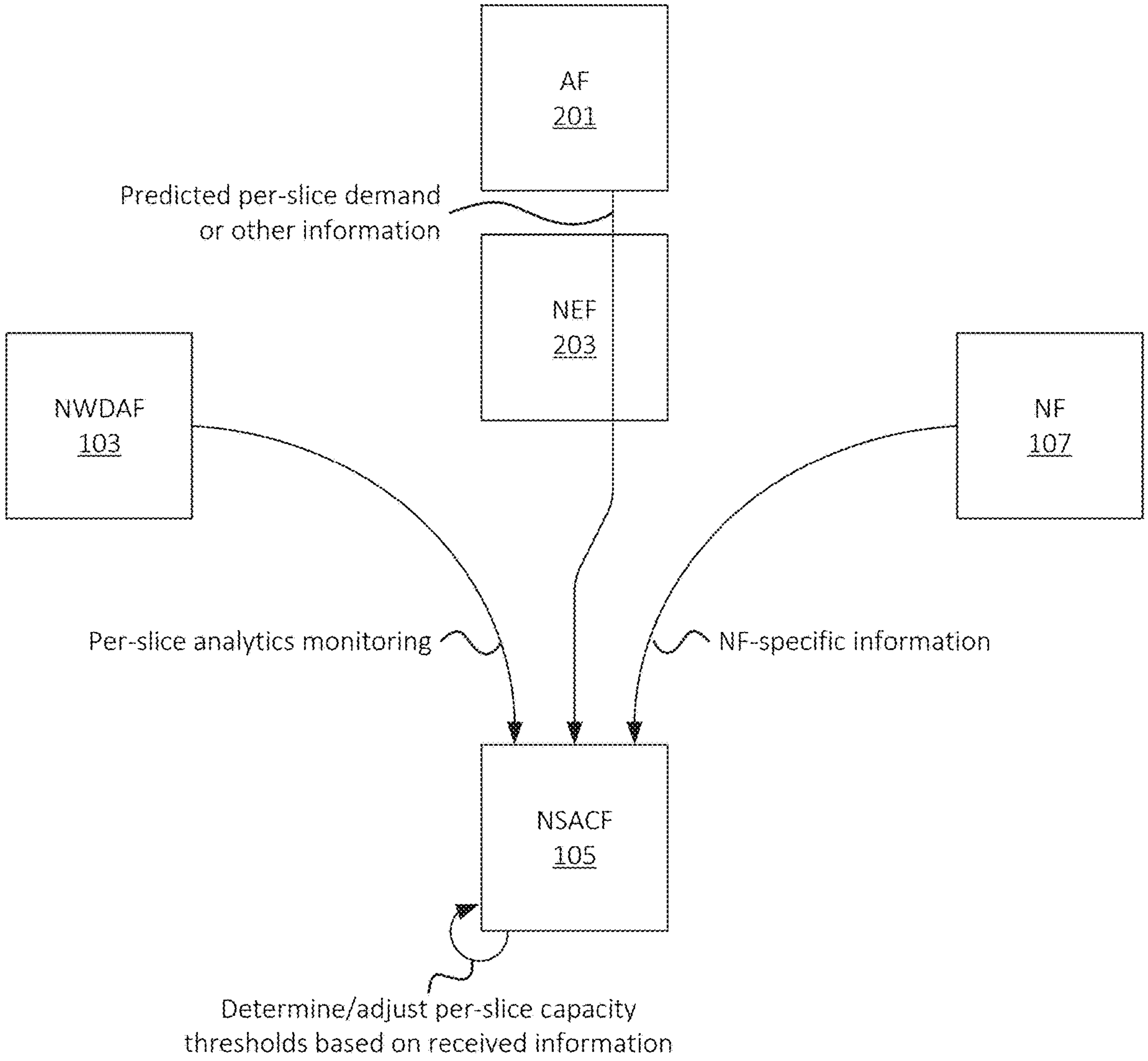
FIG. 2 illustrates an example of information sources based on which per-slice capacity thresholds may be determined or adjusted, in accordance with some embodiments.

In some embodiments, NSACF 105 may determine or adjust per-slice capacity thresholds based on information in addition to, or in lieu of, network analytics information. For example, as shown in FIG. 2, NSACF may monitor or otherwise receive per-slice analytics information from NWDAF 103, as discussed above.

Additionally, or alternatively, NSACF 105 may receive information from Application Function ("AF") 201 and/or one or more devices external to network 101 (e.g., via Network Exposure Function ("NEF") 203 and/or some other suitable interface), based on which NSACF may determine or adjust per-slice capacity thresholds. For example, such information may include a measure of demand for one or more network slices. The measure of demand may be a predictive or estimated measure of demand, and may be determined via AI/ML techniques (e.g., based on historical or simulated demand information) or other suitable predictive techniques. The measure of demand may indicate, for example, a quantity of UEs that are predicted to request access via a given network slice over a particular timeframe, a quantity of PDU sessions that are predicted to be established via a given network slice over a particular timeframe, or other suitable demand information.

In some embodiments, determining or adjusting the per-slice capacity based on the demand may include increasing a capacity threshold for a given network slice when predicted demand via the network slice is relatively high, and/or reducing a capacity threshold for the network slice when predicted demand via the network slice is relatively low. In some embodiments, adjusting the network slice capacity thresholds based on predicted demand may be performed in conjunction with allocating additional resources for a given network slice, and/or reducing resources associated with a given network slice (e.g., adding or removing NF instances to or from one or more network slices).

In some embodiments, NSACF 105 may receive NF-specific information from one or more other NFs 107 of network 101. For example, NF 107 may be, may include, may implement, etc. a policy element of network 101 (e.g., a Policy Control Function ("PCF"), a Policy Charging and Rules Function ("PCRF"), etc.) that provides policies that may be used by NSACF 105 to determine or adjust per-slice capacity thresholds. For example, a particular policy may indicate that the capacity threshold for a given slice should be increased at certain times of day or in response to other triggers, and/or that the capacity threshold for such slice should be decreased at other times of day or in response to other triggers. In some embodiments, NSACF 105 may subscribe (e.g., via one or more suitable SBIs), request, etc. to receive information from one or more NFs 107 of network 101, and may ultimately determine or adjust per-slice capacity thresholds based on such information.

Figure 3:
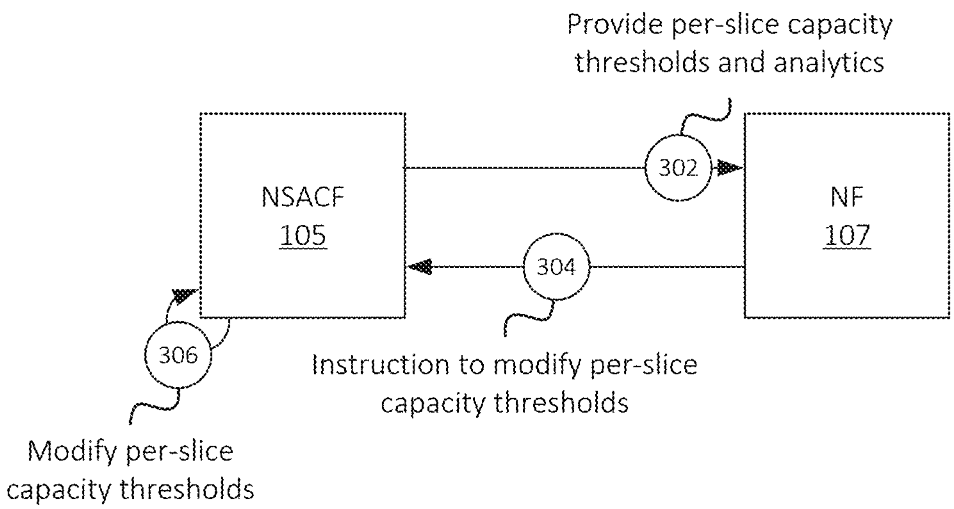
FIG. 3 illustrates an example of sending and/or receiving information with respect to per-slice capacity thresholds with one or more elements of a wireless network, in accordance with some embodiments.

As shown in FIG. 3, NSACF 105 may provide (at 302) per-slice capacity thresholds and/or analytics information to one or more NFs 107 of network 101. For example, NF 107 may subscribe to, or otherwise request, such information from NSACF 105 (e.g., via an SBI such as an Nnsacf SBI). NF 107 may, for example, request a current capacity threshold associated with one or more particular slices, and NSACF 105 may provide (at 302) such information. As another example, NF 107 may request per-slice load information, such as a quantity of UEs associated with one or more particular slices, a quantity of PDU sessions associated with one or more particular slices, and/or other information that is maintained by NSACF 105.

In some embodiments, NF 107 (e.g., the same NF to which per-slice capacity thresholds and/or analytics were provided (at 302), and/or a different NF) may output (at 304) an instruction to modify respective capacity thresholds associated with one or more network slices. For example, NF 107 may have determined, based on the per-slice capacity thresholds, analytics, and/or other information, that a capacity threshold associated with one or more slices should be increased, reduced, or otherwise modified. NF 107 may accordingly communicate (at 304) with NSACF 105 via an SBI or some other suitable interface, to instruct the modification of such per-slice capacity thresholds. In some embodiments, NSACF 105 may authenticate NF 107 and/or otherwise verify that NF 107 is authorized to modify such capacity thresholds prior to modifying (at 306) such thresholds.

Figure 4:
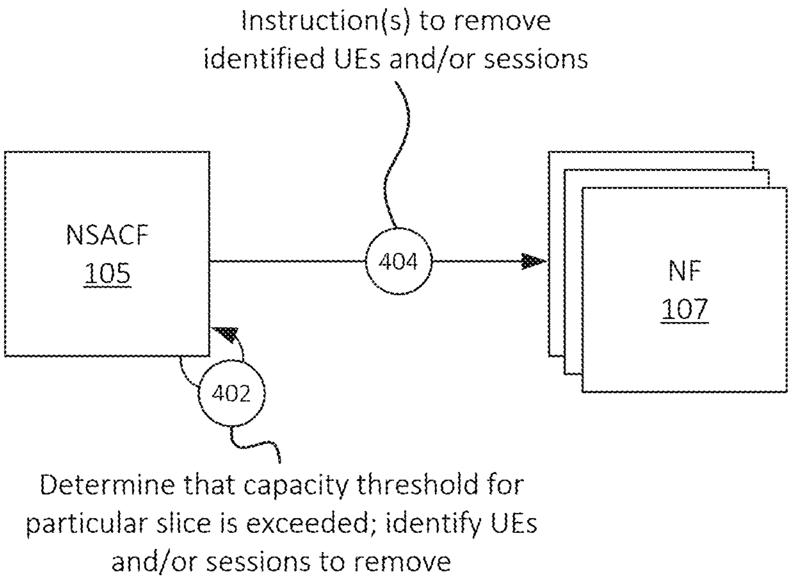
FIG. 4 illustrates an example of removing UEs or communication sessions from a given network based on reducing a capacity threshold of the network slice, in accordance with some embodiments.

In some scenarios, a modification to a particular capacity threshold for a given network slice (e.g., at 108 or 306) may include a reduction in such capacity threshold, such as a reduction in the maximum allowable quantity of UEs for the network slice and/or a reduction in the maximum allowable quantity of communication sessions (e.g., PDU sessions) for the network slice. For example, as shown in FIG. 4, NSACF 105 may determine (at 402) which UEs or communication sessions to remove. For example, as noted above, NSACF 105 may maintain or receive information indicating particular UEs and/or communication sessions associated with one or more slices of network 101. NSACF 105 may select UEs or communication sessions to remove from a given slice (e.g., for which access to a given slice should be revoked or removed) based on factors such as "age" of UEs or communication sessions (e.g., UEs that have been connected to network 101 for the longest amount of time, PDU sessions that have been established for the longest amount of time, UEs that have been connected to network 101 for the shortest amount of time, PDU sessions that have been established for the shorted shortest amount of time, etc.). Additionally, or alternatively, NSACF 105 may select UEs or communication sessions to remove based on traffic or service type associated with such UEs or communication sessions (e.g., may remove UEs or communication sessions associated with a particular traffic or service type such as file download or content streaming before removing UEs or communication sessions associated with a different traffic or service type such as voice or video calls). NSACF 105 may accordingly output (at 404) one or more instructions to remove the selected UEs or communication sessions from network 101 (e.g., which may include disconnecting the UEs from network 101, revoking access of such UEs to access a particular network slice of network 101, de-establishing or terminating one or more PDU sessions, etc.).

In some embodiments, NSACF 105 may output a notification to one or more NFs 107 that a particular network slice is congested or overloaded (e.g., that a capacity threshold associated with such network slice is exceeded), and such NF(s) 107 may in turn select one or more UEs or communication sessions to remove, in order to meet the capacity threshold associated with the particular network slice. For example, in such embodiments, NSACF 105 may forgo identifying (at 402) which UEs or communication sessions to remove, and NF(s) 107 may instead identify which UEs or communication sessions to remove. Such NF(s) 107 may accordingly cause the removal of the UEs and/or communication sessions. For example, a given NF 107 may include, may implement, or may communicate with an AMF, which may disconnect a selected UE from network 101 (e.g., may instruct such UE and/or a base station to which the UE is connected that the UE no longer has access to network 101 and/or no longer has access to the network slice for which access has been removed). As another example, NF 107 may include, may implement, or may communicate with an SMF, which may communicate with a selected UE or one or more network devices that are communicatively coupled to the UE (e.g., a User Plane Function ("UPF"), a Packet Data Network ("PDN") gateway ("PGW"), etc.) to de-establish one or more PDU sessions between the UE and network 101.

In some embodiments, similar operations discussed with respect to one or more NFs 107 may be performed by one or more devices that are external to network 101. For example, as discussed above with respect to FIG. 2, AF 201 and/or one or more other devices or systems may communicate with NSACF 105 via NEF 203 and/or some other suitable interface, device, or system. In some embodiments, one or more operations described in FIGS. 3 and 4 with respect to NF 107 may be performed by AF 201 and/or one or more devices or systems that are external to network 101, which may communicate with NSACF 105 via NEF 203.

Figure 5:
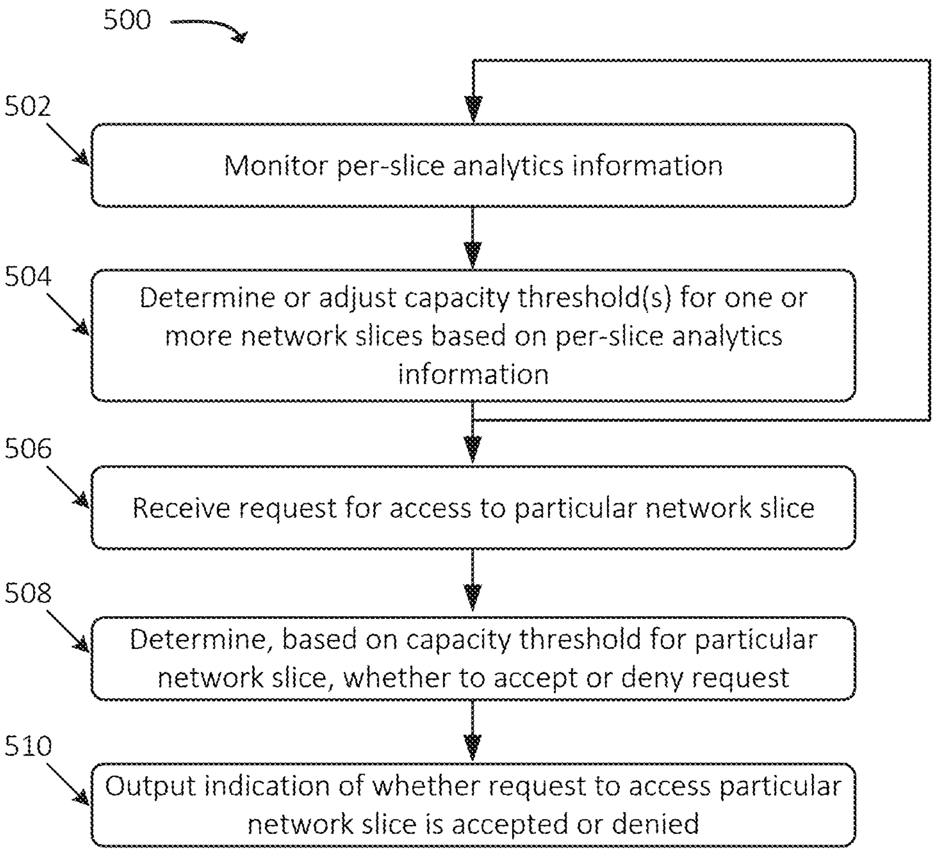
FIG. 5 illustrates an example process for determining or adjusting a per-slice capacity threshold for a wireless network, in accordance with some embodiments.

FIG. 5 illustrates an example process 500 for determining or adjusting a per-slice capacity threshold for a wireless network. In some embodiments, some or all of process 500 may be performed by NSACF 105. In some embodiments, one or more other devices may perform some or all of process 500 in concert with, and/or in lieu of, NSACF 105. For example, in some embodiments, one or more devices or systems that are communicatively coupled to NSACF 105 (e.g., a particular AF 201 or other suitable device or system) may perform some or all of the operations described below.

As shown, process 500 may include monitoring (at 502) per-slice analytics information associated with one or more network slices of network 101. For example, as discussed above, NSACF 105 may receive network analytics information, associated with one or more respective network slices, from NWDAF 103 or some other suitable source. As discussed above, network analytics information for a particular network slice may include a throughput or amount of traffic sent via the particular network slice at a particular time or during a particular timeframe, a measure of latency associated with the particular network slice at a particular time or during a particular timeframe, one or more performance scores associated with the particular network slice at a particular time or during a particular timeframe, and/or other suitable analytics information. Generally, the analytics information may indicate whether QoS parameters, SLAs, performance thresholds, etc. associated with the particular network slice are being met.

Process 500 may further include determining or adjusting (at 504) capacity thresholds associated with one or more of the network slices of network 101 based on the monitored per-slice analytics information. For example, as discussed above, NSACF 105 may determine a maximum quantity of allowed UEs for a given network slice, a maximum quantity of allowed communication sessions associated with the given network slice, or other suitable capacity thresholds.

As discussed above, a maximum quantity of allowed UEs for a particular network slice may refer to a maximum quantity of UEs that are permitted to be connected to network 101 (e.g., simultaneously or contemporaneously connected at a given time or during a particular timeframe) and to have access to the particular network slice while connected to network 101. For example, a UE that has received (e.g., from an AMF) an indication that the UE is authorized to access the particular network slice may be considered as a UE that is "associated with" the particular network slice, while a UE that has not received such indication may be considered as a UE that is not "associated with" the particular network slice. As another example, a maximum quantity of communication sessions associated with the particular network slice may refer to a quantity of PDU sessions or other types of communication sessions that are associated with one or more NFs 107 (e.g., a UPF, a PGW, etc.) that is associated with the particular network slice, or that are otherwise marked, tagged, flagged, etc. as being associated with such network slice.

Process 500 may additionally include receiving (at 506) a request for access to a particular network slice. For example, as discussed above, a particular NF 107 (e.g., an AMF, an SMF, or some other device or system) may output a request to NSACF 105 (e.g., on behalf of one or more UEs) for access to the particular network slice. Such request may be associated with a connection procedure between the UE and network 101, and may be received from an AMF and/or some other suitable device or system that participates in or facilitates the connection of the UE to network 101. As another example, the request may be associated with a communication session establishment or modification procedure (e.g., a PDU session establishment or modification procedure), and may be received from an SMF or other suitable device or system that participates in or facilitates the communication session establishment or modification procedure.

Process 500 may also include determining (at 508), based on the capacity threshold for the particular network slice, whether to accept or deny the request. For example, NSACF 105 may determine whether the particular network slice has available capacity to accommodate the requested additional UE(s) and/or communication session(s). NSACF 105 may, for example, determine a current quantity of connected UEs and/or established communication sessions associated with the particular network slice, and may make a determination as to whether accepting the request would cause such capacity thresholds to be exceeded. In situations where accepting the request would not cause such capacity thresholds to be exceeded, then NSACF 105 may determine that the request should be accepted (e.g., should not be denied). On the other hand, in situations where accepting the request would cause such capacity thresholds to be exceeded, then NSACF 105 may determine that the request should be denied (e.g., should not be accepted).

Process 500 may further include outputting (at 510) an indication of whether the request to access the particular network slice is accepted or denied. For example, NSACF 105 may output, to the particular NF 107 from which the request was received, and/or to some other suitable device or system, an indication of whether NSACF 105 has accepted or denied the request. If the request is accepted, NF 107 may continue with one or more suitable procedures that are based on access to the particular network slice, such as a connection of the UE to network 101 via the particular network slice, and/or the establishment or modification of a communication session via the particular network slice, as discussed above.

Figure 6:
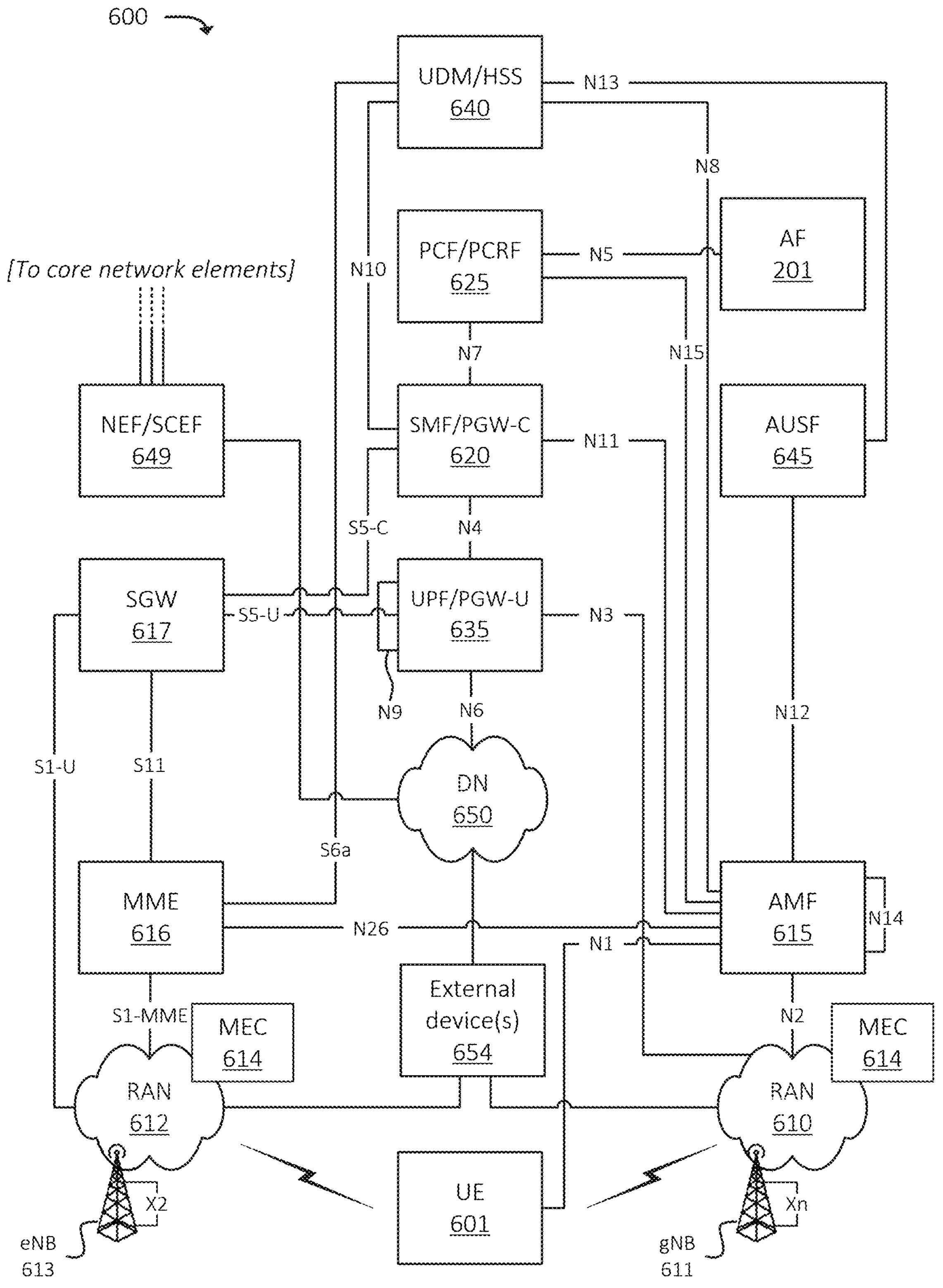
FIGS. 6 and 7 illustrate example environments in which one or more embodiments, described herein, may be implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 600 may represent or may include a 5G core ("5GC"). As shown, environment 600 may include UE 601, RAN 610 (which may include one or more Next Generation Node Bs ("gNBs") 611), RAN 612 (which may include one or more evolved Node Bs ("eNBs") 613), and various network functions such as AMF 615, Mobility Management Entity ("MME") 616, SGW 617, SMF/PGW-Control plane function ("PGW-C") 620, PCF/PCRF 625, AF 201, UPF/PGW-User plane function ("PGW-U") 635, UDM/HSS 640, Authentication Server Function ("AUSF") 645, and Network Exposure Function ("NEF")/Service Capability Exposure Function ("SCEF") 649. Environment 600 may also include one or more networks, such as Data Network ("DN") 650. Environment 600 may include one or more additional devices or systems communicatively coupled to one or more networks (e.g., DN 650), such as one or more external devices 654. In the description above, NF 107 may include, may be implemented by, may implement, may refer to, and/or may be otherwise associated with one or more of the above-mentioned elements of environment 600.

The example shown in FIG. 6 illustrates one instance of each network component or function (e.g., one instance of SMF/PGW-C 620, PCF/PCRF 625, UPF/PGW-U 635, UDM/HSS 640, and/or AUSF 645). In practice, environment 600 may include multiple instances of such components or functions. For example, in some embodiments, environment 600 may include multiple "slices" of a core network, where each slice includes a discrete and/or logical set of network functions (e.g., one slice may include a first instance of AMF 615, SMF/PGW-C 620, PCF/PCRF 625, and/or UPF/PGW-U 635, while another slice may include a second instance of AMF 615, SMF/PGW-C 620, PCF/PCRF 625, and/or UPF/PGW-U 635). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. In some implementations, one or more devices of environment 600 may be physically integrated in, and/or may be physically attached to, one or more other devices of environment 600. Alternatively, or additionally, one or more of the devices of environment 600 may perform one or more network functions described as being performed by another one or more of the devices of environment 600.

Additionally, one or more elements of environment 600 may be implemented in a virtualized and/or containerized manner. For example, one or more of the elements of environment 600 may be implemented by one or more Virtualized Network Functions ("VNFs"), Cloud-Native Network Functions ("CNFs"), etc. In such embodiments, environment 600 may include, may implement, and/or may be communicatively coupled to an orchestration platform that provisions hardware resources, installs containers or applications, performs load balancing, and/or otherwise manages the deployment of such elements of environment 600. In some embodiments, such orchestration and/or management of such elements of environment 600 may be performed by, or in conjunction with, the open-source Kubernetes® application programming interface ("API") or some other suitable virtualization, containerization, and/or orchestration system.

Elements of environment 600 may interconnect with each other and/or other devices via wired connections, wireless connections, or a combination of wired and wireless connections. Examples of interfaces or communication pathways between the elements of environment 600, as shown in FIG. 6, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an Soa interface, an S11 interface, and/or one or more other interfaces. Such interfaces may include interfaces not explicitly shown in FIG. 6, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 600 may be, may include, may be implemented by, and/or may be communicatively coupled to network 101.

UE 601 may include a computation and communication device, such as a wireless mobile communication device that is capable of communicating with RAN 610, RAN 612, and/or DN 650. UE 601 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a programmable logic controller or other industrial controller, a Machine-to-Machine ("M2M") device, or the like), a Fixed Wireless Access ("FWA") device, or another type of mobile computation and communication device. UE 601 may send traffic to and/or receive traffic (e.g., user plane traffic) from DN 650 via RAN 610, RAN 612, and/or UPF/PGW-U 635.

RAN 610 may be, or may include, a 5G RAN that implements a 5G RAT and that includes one or more base stations (e.g., one or more gNBs 611), via which UE 601 may communicate with one or more other elements of environment 600. UE 601 may communicate with RAN 610 via an air interface (e.g., as provided by gNB 611). For instance, RAN 610 may receive traffic (e.g., user plane traffic such as voice call traffic, data traffic, messaging traffic, etc.) from UE 601 via the air interface, and may communicate the traffic to UPF/PGW-U 635 and/or one or more other devices or networks. Further, RAN 610 may receive signaling traffic, control plane traffic, etc. from UE 601 via the air interface, and may communicate such signaling traffic, control plane traffic, etc. to AMF 615 and/or one or more other devices or networks. Additionally, RAN 610 may receive traffic intended for UE 601 (e.g., from UPF/PGW-U 635, AMF 615, and/or one or more other devices or networks) and may communicate the traffic to UE 601 via the air interface.

RAN 612 may be, or may include, an LTE RAN that implements an LTE RAT and that includes one or more base stations (e.g., one or more eNBs 613), via which UE 601 may communicate with one or more other elements of environment 600. UE 601 may communicate with RAN 612 via an air interface (e.g., as provided by eNB 613). For instance, RAN 612 may receive traffic (e.g., user plane traffic such as voice call traffic, data traffic, messaging traffic, signaling traffic, etc.) from UE 601 via the air interface, and may communicate the traffic to UPF/PGW-U 635 (e.g., via SGW 617) and/or one or more other devices or networks. Further, RAN 612 may receive signaling traffic, control plane traffic, etc. from UE 601 via the air interface, and may communicate such signaling traffic, control plane traffic, etc. to MME 616 and/or one or more other devices or networks. Additionally, RAN 612 may receive traffic intended for UE 601 (e.g., from UPF/PGW-U 635, MME 616, SGW 617, and/or one or more other devices or networks) and may communicate the traffic to UE 601 via the air interface.

One or more RANs of environment 600 (e.g., RAN 610 and/or RAN 612) may include, may implement, and/or may otherwise be communicatively coupled to one or more edge computing devices, such as one or more Multi-Access/Mobile Edge Computing ("MEC") devices (referred to sometimes herein simply as "MECs") 614. MECs 614 may be co-located with wireless network infrastructure equipment of RANs 610 and/or 612 (e.g., one or more gNBs 611 and/or one or more eNBs 613, respectively). Additionally, or alternatively, MECs 614 may otherwise be associated with geographical regions (e.g., coverage areas) of wireless network infrastructure equipment of RANs 610 and/or 612. In some embodiments, one or more MECs 614 may be implemented by the same set of hardware resources, the same set of devices, etc. that implement wireless network infrastructure equipment of RANs 610 and/or 612. In some embodiments, one or more MECs 614 may be implemented by different hardware resources, a different set of devices, etc. from hardware resources or devices that implement wireless network infrastructure equipment of RANs 610 and/or 612. In some embodiments, MECs 614 may be communicatively coupled to wireless network infrastructure equipment of RANs 610 and/or 612 (e.g., via a high-speed and/or low-latency link such as a physical wired interface, a high-speed and/or low-latency wireless interface, or some other suitable communication pathway).

MECs 614 may include hardware resources (e.g., configurable or provisionable hardware resources) that may be configured to provide services and/or otherwise process traffic to and/or from UE 601, via RAN 610 and/or 612. For example, RAN 610 and/or 612 may route some traffic from UE 601 (e.g., traffic associated with one or more particular services, applications, application types, etc.) to a respective MEC 614 instead of to core network elements of environment 600 (e.g., UPF/PGW-U 635). MEC 614 may accordingly provide services to UE 601 by processing such traffic, performing one or more computations based on the received traffic, and providing traffic to UE 601 via RAN 610 and/or 612. MEC 614 may include, and/or may implement, some or all of the functionality described above with respect to UPF/PGW-U 635, AF 201, one or more application servers, and/or one or more other devices, systems, VNFs, CNFs, etc. In this manner, ultra-low latency services may be provided to UE 601, as traffic does not need to traverse links (e.g., backhaul links) between RAN 610 and/or 612 and the core network.

AMF 615 may include one or more devices, systems, VNFs, CNFs, etc., that perform operations to register UE 601 with the 5G network, to establish bearer channels associated with a session with UE 601, to hand off UE 601 from the 5G network to another network, to hand off UE 601 from the other network to the 5G network, to manage mobility of UE 601 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, CNFs, etc., that perform operations to register UE 601 with the EPC, to establish bearer channels associated with a session with UE 601, to hand off UE 601 from the EPC to another network, to hand off UE 601 from another network to the EPC, to manage mobility of UE 601 between RANs 612 and/or eNBs 613, and/or to perform other operations.

SGW 617 may include one or more devices, systems, VNFs, CNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, CNFs, etc., that gather, process, store, and/or provide information in a manner described herein. SMF/PGW-C 620 may, for example, facilitate the establishment of communication sessions on behalf of UE 601. In some embodiments, the establishment of communications sessions may be performed in accordance with one or more policies provided by PCF/PCRF 625.

PCF/PCRF 625 may include one or more devices, systems, VNFs, CNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 201 may include one or more devices, systems, VNFs, CNFs, etc., that receive, store, and/or provide information that may be used in determining parameters (e.g., quality of service parameters, charging parameters, or the like) for certain applications. In some embodiments, AF 201 may access one or more other network elements via NEF/SCEF 649.

UPF/PGW-U 635 may include one or more devices, systems, VNFs, CNFs, etc., that receive, store, and/or provide data (e.g., user plane data). For example, UPF/PGW-U 635 may receive user plane data (e.g., voice call traffic, data traffic, etc.), destined for UE 601, from DN 650, and may forward the user plane data toward UE 601 (e.g., via RAN 610, SMF/PGW-C 620, and/or one or more other devices). In some embodiments, multiple instances of UPF/PGW-U 635 may be deployed (e.g., in different geographical locations), and the delivery of content to UE 601 may be coordinated via the N9 interface (e.g., as denoted in FIG. 6 by the line marked "N9" originating and terminating at UPF/PGW-U 635). Similarly, UPF/PGW-U 635 may receive traffic from UE 601 (e.g., via RAN 610, RAN 612, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

UDM/HSS 640 and AUSF 645 may include one or more devices, systems, VNFs, CNFs, etc., that manage, update, and/or store, in one or more memory devices associated with AUSF 645 and/or UDM/HSS 640, profile information associated with a subscriber. In some embodiments, UDM/HSS 640 may include, may implement, may be communicatively coupled to, and/or may otherwise be associated with some other type of repository or database, such as a UDR. AUSF 645 and/or UDM/HSS 640 may perform authentication, authorization, and/or accounting operations associated with one or more UEs 601 and/or one or more communication sessions associated with one or more UEs 601.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 601 may communicate, through DN 650, with data servers, other UEs 601, and/or other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 601 may communicate.

External devices 654 may include one or more devices or systems that communicate with UE 601 via DN 650 and one or more elements of environment 600 (e.g., via UPF/PGW-U 635). External devices 654 may include, for example, one or more application servers, content provider systems, web servers, or the like. External devices 654 may, for example, implement "server-side" applications that communicate with "client-side" applications executed by UE 601. External devices 654 may provide services to UE 601 such as gaming services, videoconferencing services, messaging services, email services, web services, and/or other types of services.

In some embodiments, external devices 654 may communicate with one or more elements of environment 600 (e.g., core network elements) via NEF/SCEF 649. NEF/SCEF 649 may include one or more devices, systems, VNFs, CNFs, etc. that provide access to information, APIs, and/or other operations or mechanisms of one or more core network elements to devices or systems that are external to the core network (e.g., to external device 654 via DN 650). NEF/SCEF 649 may maintain authorization and/or authentication information associated with such external devices or systems, such that NEF/SCEF 649 is able to provide information, that is authorized to be provided, to the external devices or systems. For example, a given external device 654 may request particular information associated with one or more core network elements. NEF/SCEF 649 may authenticate the request and/or otherwise verify that external device 654 is authorized to receive the information, and may request, obtain, or otherwise receive the information from the one or more core network elements. In some embodiments, NEF/SCEF 649 may include, may implement, may be implemented by, may be communicatively coupled to, and/or may otherwise be associated with a Security Edge Protection Proxy ("SEPP"), which may perform some or all of the functions discussed above. External device 654 may, in some situations, subscribe to particular types of requested information provided by the one or more core network elements, and the one or more core network elements may provide (e.g., "push") the requested information to NEF/SCEF 649 (e.g., on a periodic or otherwise ongoing basis). In some embodiments, NEF/SCEF 649 may include, may implement, may be implemented by, and/or may otherwise be associated with NEF 203.

In some embodiments, external devices 654 may communicate with one or more elements of RAN 610 and/or 612 via an API or other suitable interface. For example, a given external device 654 may provide instructions, requests, etc. to RAN 610 and/or 612 to provide one or more services via one or more respective MECs 614. In some embodiments, such instructions, requests, etc. may include QoS parameters, Service Level Agreements ("SLAs"), etc. (e.g., maximum latency thresholds, minimum throughput thresholds, etc.) associated with the services.

Figure 7:
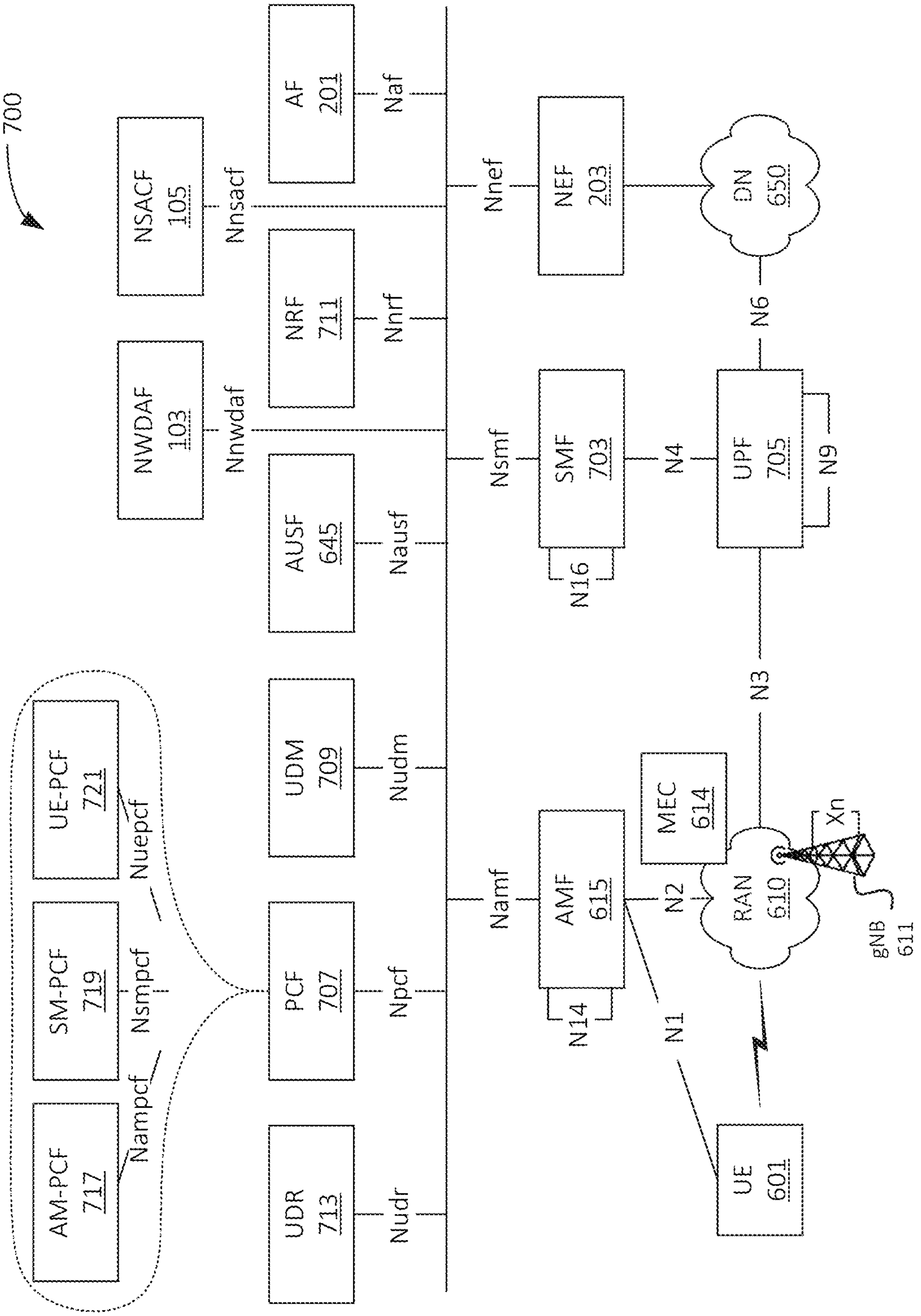

FIG. 7 illustrates another example environment 700, in which one or more embodiments may be implemented. In some embodiments, environment 700 may correspond to a 5G network, and/or may include elements of a 5G network. In some embodiments, environment 700 may correspond to a 5G SA architecture. In some embodiments, environment 700 may include a 5GC, in which 5GC network elements perform one or more operations described herein.

As shown, environment 700 may include UE 601, RAN 610 (which may include one or more gNBs 611 or other types of wireless network infrastructure) and various network functions, which may be implemented as VNFs, CNFs, etc. Such network functions may include AMF 615, SMF 703, UPF 705, PCF 707, UDM 709, AUSF 645, Network Repository Function ("NRF") 711, AF 201, UDR 713, NWDAF 103, NSACF 105, and/or NEF 203. Environment 700 may also include or may be communicatively coupled to one or more networks, such as DN 650. In the description above, NF 107 may include, may be implemented by, may implement, may refer to, and/or may be otherwise associated with one or more of the above-mentioned elements of environment 700.

The example shown in FIG. 7 illustrates one instance of each network component or function (e.g., one instance of SMF 703, UPF 705, PCF 707, UDM 709, AUSF 645, etc.). In practice, environment 700 may include multiple instances of such components or functions. For example, in some embodiments, environment 700 may include multiple "slices" of a core network, where each slice includes a discrete and/or logical set of network functions (e.g., one slice may include a first instance of SMF 703, PCF 707, UPF 705, etc., while another slice may include a second instance of SMF 703, PCF 707, UPF 705, etc.). Additionally, or alternatively, one or more of the network functions of environment 700 may implement multiple network slices. The different slices may provide differentiated levels of service, such as service in accordance with different QoS parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Elements of environment 700 may interconnect with each other and/or other devices via wired connections, wireless connections, or a combination of wired and wireless connections. Examples of interfaces or communication pathways between the elements of environment 700, as shown in FIG. 7, may include interfaces shown in FIG. 7 and/or one or more interfaces not explicitly shown in FIG. 7. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 700 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 615), an Nudm interface (e.g., indicating communications to be routed to UDM 709), an Npcf interface, an Nupf interface, an Nnef interface, an Nsmf interface, an Nnrf interface, an Nudr interface, an Naf interface, an Nnwdaf interface, an Nnsacf interface, and/or one or more other SBIs. In some embodiments, environment 700 may be, may include, may be implemented by, and/or may be communicatively coupled to network 101.

UPF 705 may include one or more devices, systems, VNFs, CNFs, etc., that receive, route, process, and/or forward traffic (e.g., user plane traffic). As discussed above, UPF 705 may communicate with UE 601 via one or more communication sessions, such as PDU sessions. Such PDU sessions may be associated with a particular network slice or other suitable QoS parameters, as noted above. UPF 705 may receive downlink user plane traffic (e.g., voice call traffic, data traffic, etc. destined for UE 601) from DN 650, and may forward the downlink user plane traffic toward UE 601 (e.g., via RAN 610). In some embodiments, multiple UPFs 705 may be deployed (e.g., in different geographical locations), and the delivery of content to UE 601 may be coordinated via the N9 interface. Similarly, UPF 705 may receive uplink traffic from UE 601 (e.g., via RAN 610), and may forward the traffic toward DN 650. In some embodiments, UPF 705 may implement, may be implemented by, may be communicatively coupled to, and/or may otherwise be associated with UPF/PGW-U 635. In some embodiments, UPF 705 may communicate (e.g., via the N4 interface) with SMF 703, regarding user plane data processed by UPF 705 (e.g., to provide analytics or reporting information, to receive policy and/or authorization information, etc.).

PCF 707 may include one or more devices, systems, VNFs, CNFs, etc., that aggregate, derive, generate, etc. policy information associated with the 5GC and/or UEs 601 that communicate via the 5GC and/or RAN 610. PCF 707 may receive information regarding policies and/or subscriptions from one or more sources, such as subscriber databases (e.g., UDM 709, UDR 713, etc.), and/or from one or more users such as, for example, an administrator associated with PCF 707. In some embodiments, the functionality of PCF 707 may be split into multiple network functions or subsystems, such as access and mobility PCF ("AM-PCF") 717, session management PCF ("SM-PCF") 719, UE PCF ("UE-PCF") 721, and so on. Such different "split" PCFs may be associated with respective SBIs (e.g., AM-PCF 717 may be associated with an Nampcf SBI, SM-PCF 719 may be associated with an Nsmpcf SBI, UE-PCF 721 may be associated with an Nuepcf SBI, and so on) via which other network functions may communicate with the split PCFs. The split PCFs may maintain information regarding policies associated with different devices, systems, and/or network functions.

NRF 711 may include one or more devices, systems, VNFs, CNFs, etc. that maintain routing and/or network topology information associated with the 5GC. For example, NRF 711 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 713 may include one or more devices, systems, VNFs, CNFs, etc. that provide user and/or subscriber information, based on which PCF 707 and/or other elements of environment 700 may determine access policies, QoS policies, charging policies, or the like. In some embodiments, UDR 713 may receive such information from UDM 709 and/or one or more other sources.

NEF 203 may include one or more devices, systems, VNFs, CNFs, etc. that provide access to information, APIs, and/or other operations or mechanisms of the 5GC to devices or systems that are external to the 5GC. NEF 203 may maintain authorization and/or authentication information associated with such external devices or systems, such that NEF 203 is able to provide information, that is authorized to be provided, to the external devices or systems. Such information may be received from other network functions of the 5GC (e.g., as authorized by an administrator or other suitable entity associated with the 5GC), such as SMF 703, UPF 705, a charging function ("CHF") of the 5GC, and/or other suitable network function. NEF 203 may communicate with external devices or systems (e.g., external devices 654) via DN 650 and/or other suitable communication pathways.

While environment 700 is described in the context of a 5GC, as noted above, environment 700 may, in some embodiments, include or implement one or more other types of core networks. For example, in some embodiments, environment 700 may be or may include a converged packet core, in which one or more elements may perform some or all of the functionality of one or more 5GC network functions and/or one or more EPC network functions. For example, in some embodiments, AMF 615 may include, may implement, may be implemented by, and/or may otherwise be associated with MME 616; SMF 703 may include, may implement, may be implemented by, and/or may otherwise be associated with SGW 617; PCF 707 may include, may implement, may be implemented by, and/or may otherwise be associated with a PCRF (e.g., PCF/PCRF 625); NEF 203 may include, may implement, may be implemented by, and/or may otherwise be associated with a SCEF (e.g., NEF/SCEF 649); and so on.

Figure 8:
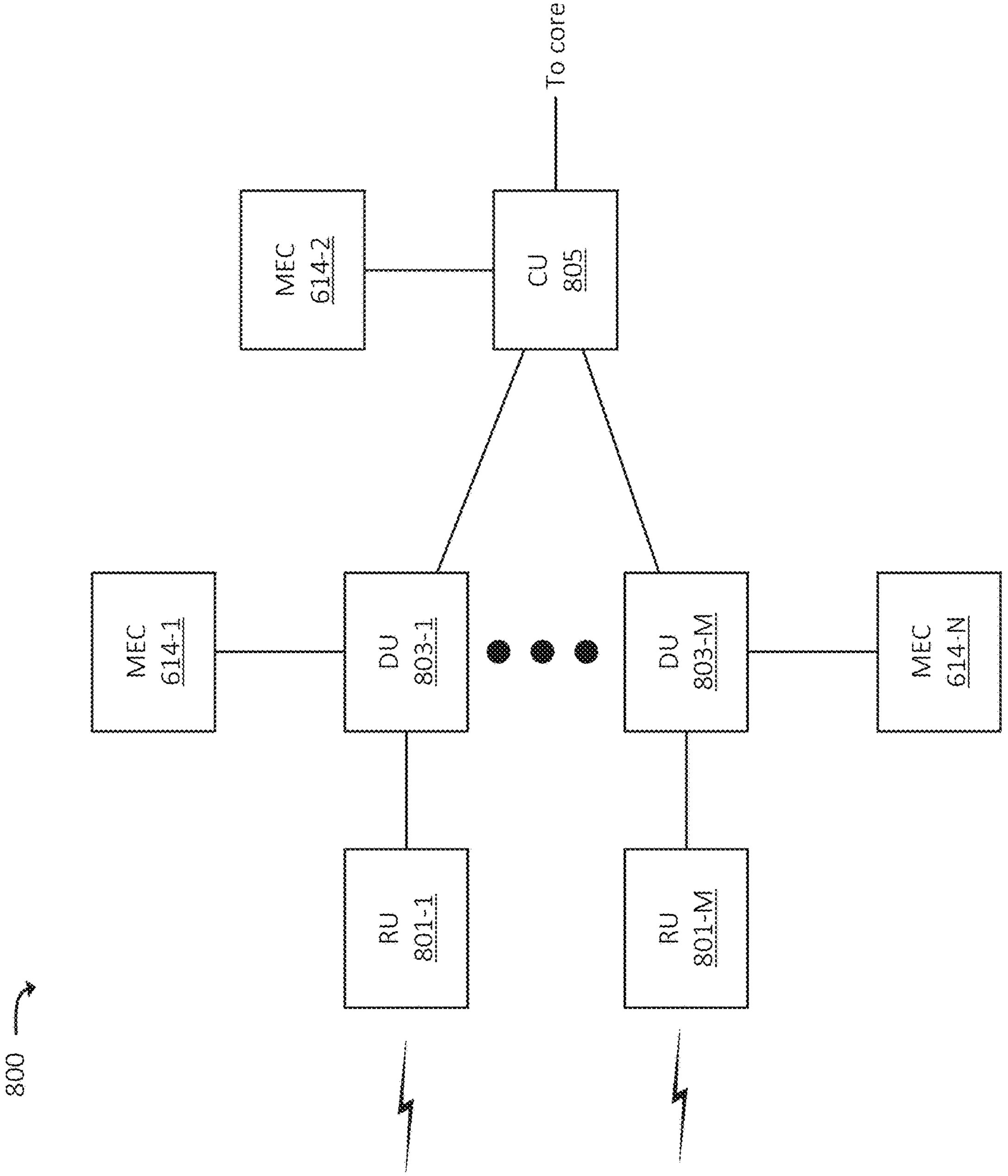
FIG. 8 illustrates an example arrangement of a radio access network ("RAN"), in accordance with some embodiments.

FIG. 8 illustrates an example RAN environment 800, which may be included in and/or implemented by one or more RANs (e.g., RAN 610 or some other RAN). In some embodiments, a particular RAN 610 may include one RAN environment 800. In some embodiments, a particular RAN 610 may include multiple RAN environments 800. In some embodiments, RAN environment 800 may correspond to a particular gNB 611 of RAN 610. In some embodiments, RAN environment 800 may correspond to multiple gNBs 611. In some embodiments, RAN environment 800 may correspond to one or more other types of base stations of one or more other types of RANs. As shown, RAN environment 800 may include Central Unit ("CU") 805, one or more Distributed Units ("DUs") 803-1 through 803-M (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 615 and/or UPF 705) and/or some other device or system such as MEC 614. In the uplink direction (e.g., for traffic from UEs 601 to a core network), CU 805 may aggregate traffic from DUs 803, and forward the aggregated traffic to the core network. In some embodiments, CU 805 may receive traffic according to a given protocol (e.g., Radio Link Control ("RLC") traffic) from DUs 803, and may perform higher-layer processing (e.g., may aggregate/process RLC packets and generate Packet Data Convergence Protocol ("PDCP") packets based on the RLC packets) on the traffic received from DUs 803.

CU 805 may receive downlink traffic (e.g., traffic from the core network, traffic from a given MEC 614, etc.) for a particular UE 601, and may determine which DU(s) 803 should receive the downlink traffic. DU 803 may include one or more devices that transmit traffic between a core network (e.g., via CU 805) and UE 601 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 601.

RU 801 may include hardware circuitry (e.g., one or more RF transceivers, antennas, radios, and/or other suitable hardware) to communicate wirelessly (e.g., via an RF interface) with one or more UEs 601, one or more other DUs 803 (e.g., via RUs 801 associated with DUs 803), and/or any other suitable type of device. In the uplink direction, RU 801 may receive traffic from UE 601 and/or another DU 803 via the RF interface and may provide the traffic to DU 803. In the downlink direction, RU 801 may receive traffic from DU 803, and may provide the traffic to UE 601 and/or another DU 803.

One or more elements of RAN environment 800 may, in some embodiments, be communicatively coupled to one or more MECs 614. For example, DU 803-1 may be communicatively coupled to MEC 614-1, DU 803-M may be communicatively coupled to MEC 614-N, CU 805 may be communicatively coupled to MEC 614-2, and so on. MECs 614 may include hardware resources (e.g., configurable or provisionable hardware resources) that may be configured to provide services and/or otherwise process traffic to and/or from UE 601, via a respective RU 801.

For example, DU 803-1 may route some traffic, from UE 601, to MEC 614-1 instead of to a core network via CU 805. MEC 614-1 may process the traffic, perform one or more computations based on the received traffic, and may provide traffic to UE 601 via RU 801-1. As discussed above, MEC 614 may include, and/or may implement, some or all of the functionality described above with respect to UPF 705, AF 201, and/or one or more other devices, systems, VNFs, CNFs, etc. In this manner, ultra-low latency services may be provided to UE 601, as traffic does not need to traverse DU 803, CU 805, links between DU 803 and CU 805, and an intervening backhaul network between RAN environment 800 and the core network.

Figure 9:
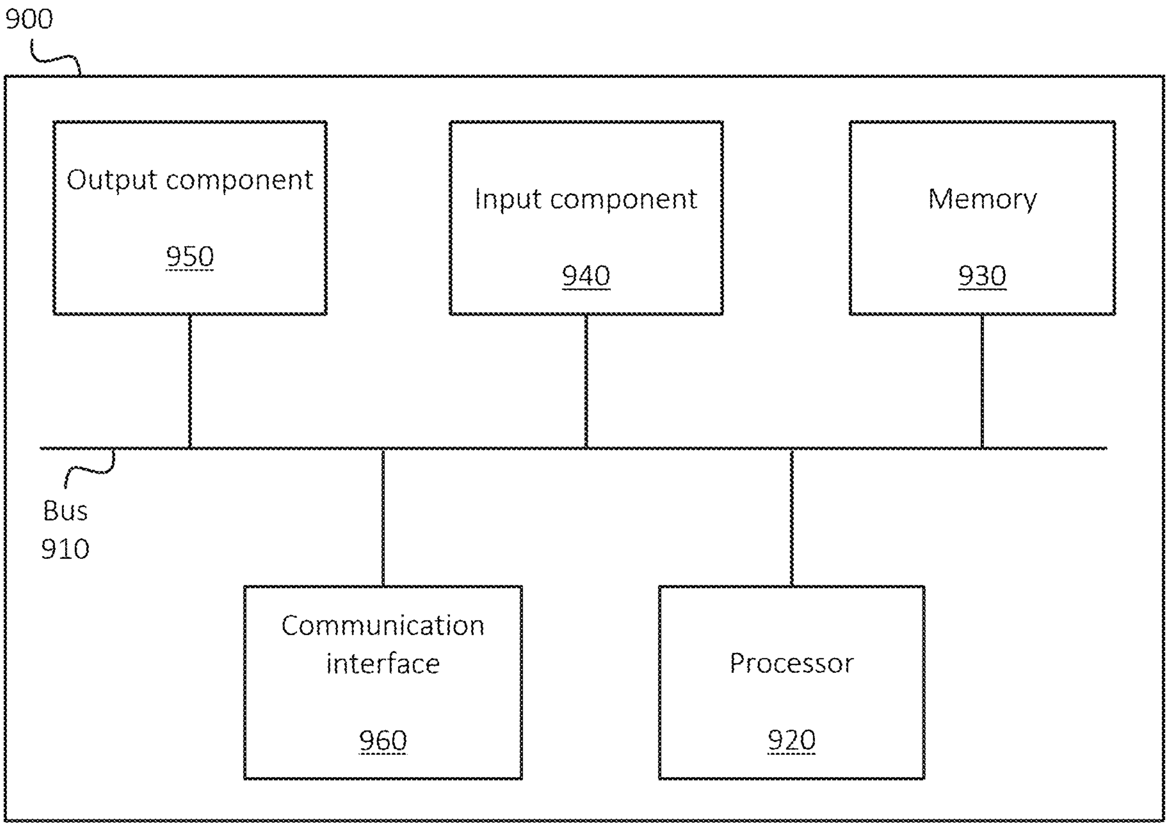
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, a set of provisioned hardware resources of a cloud computing system, or other suitable type of hardware that interprets and/or executes instructions (e.g., processor-executable instructions). In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or otherwise receives or detects input from a source external to input component 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems (e.g., via RAN 610, RAN 612, DN 650, etc.). For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 900 may include more than one communication interface 960. For instance, device 900 may include an optical interface, a wireless interface, an Ethernet interface, and/or one or more other interfaces.

Device 900 may perform certain operations relating to one or more processes described above. Device 900 may perform these operations in response to processor 920 executing instructions, such as software instructions, processor-executable instructions, etc. stored in a computer-readable medium, such as memory 930. A computer-readable medium may be defined as a non-transitory memory device. A memory device may include space within a single physical memory device or spread across multiple physical memory devices. The instructions may be read into memory 930 from another computer-readable medium or from another device. The instructions stored in memory 930 may be processor-executable instructions that cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

monitor analytics information with respect to a plurality of network slices of a wireless network;

determine, based on the monitored analytics information, a capacity threshold for at least a particular network slice of the plurality of network slices;

receive a request for access to the particular network slice;

determine, based on the capacity threshold for the particular network slice, whether to accept or deny the request;

output, in response to the request and based on determining whether to accept or deny the request, an indication of whether the request is accepted or denied;

continue to monitor analytics information with respect to the particular network slice;

determine, based on continuing to monitor the analytics information with respect to the particular network slice, a modified capacity threshold with respect to the particular network slice;

identify that the modified capacity threshold is exceeded; and based on identifying that the modified capacity threshold is exceeded, perform at least one of:

select one or more User Equipment ("UEs") for which access to the particular network slice is to be revoked, or select one or more protocol data unit ("PDU") sessions, associated with the particular network slice, to remove.

2. The device of claim 1, wherein the device includes a Network Slice Admission Control Function ("NSACF") of the wireless network.

3. The device of claim 1, wherein the request is received via a Service-Based Interface ("SBI") associated with the device.

4. The device of claim 1, wherein monitoring the analytics information includes receiving the analytics information from a Network Data Analytics Function ("NWDAF") of the wireless network.

5. The device of claim 1, wherein the capacity threshold includes at least one of:

a threshold quantity of User Equipment ("UEs") that are allowed to access the particular network slice, or a threshold quantity of protocol data unit ("PDU") sessions, associated with the particular network slice, that are allowed to be established.

6. The device of claim 1, wherein the request is received from an Access and Mobility Management Function ("AMF") of the wireless network, wherein the AMF selectively indicates, to a User Equipment ("UE"), whether the UE is authorized to access the particular network slice based on the indication.

7. A non-transitory computer-readable medium, storing a plurality of processor-executable instructions to:

monitor analytics information with respect to a plurality of network slices of a wireless network;

determine, based on the monitored analytics information, a capacity threshold for at least a particular network slice of the plurality of network slices;

receive a request for access to the particular network slice;

determine, based on the capacity threshold for the particular network slice, whether to accept or deny the request;

output, in response to the request and based on determining whether to accept or deny the request, an indication of whether the request is accepted or denied;

continue to monitor analytics information with respect to the particular network slice;

determine, based on continuing to monitor the analytics information with respect to the particular network slice, a modified capacity threshold with respect to the particular network slice;

identify that the modified capacity threshold is exceeded; and based on identifying that the modified capacity threshold is exceeded, perform at least one of:

select one or more User Equipment ("UEs") for which access to the particular network slice is to be revoked, or select one or more protocol data unit ("PDU") sessions, associated with the particular network slice, to remove.

8. The non-transitory computer-readable medium of claim 7, wherein the processor-executable instructions are executed by a Network Slice Admission Control Function ("NSACF") of the wireless network.

9. The non-transitory computer-readable medium of claim 7, wherein the request is received via a Service-Based Interface ("SBI").

10. The non-transitory computer-readable medium of claim 7, wherein the processor-executable instructions further include processor-executable instructions to:

receive a request to further modify the capacity threshold for the particular network slice; and further modify the capacity threshold for the particular network slice based on the request.

11. The non-transitory computer-readable medium of claim 7, wherein monitoring the analytics information includes receiving the analytics information from a Network Data Analytics Function ("NWDAF") of the wireless network.

12. The non-transitory computer-readable medium of claim 7, wherein the capacity threshold includes at least one of:

a threshold quantity of User Equipment ("UEs") that are allowed to access the particular network slice, or a threshold quantity of protocol data unit ("PDU") sessions, associated with the particular network slice, that are allowed to be established.

13. The non-transitory computer-readable medium of claim 7, wherein the request is received from an Access and Mobility Management Function ("AMF") of the wireless network, wherein the AMF selectively indicates, to a User Equipment ("UE"), whether the UE is authorized to access the particular network slice based on the indication.

14. A method, comprising:

monitoring analytics information with respect to a plurality of network slices of a wireless network;

determining, based on the monitored analytics information, a capacity threshold for at least a particular network slice of the plurality of network slices;

receiving a request for access to the particular network slice;

determining, based on the capacity threshold for the particular network slice, whether to accept or deny the request;

outputting, in response to the request and based on determining whether to accept or deny the request, an indication of whether the request is accepted or denied;

continuing to monitor analytics information with respect to the particular network slice;

determining, based on continuing to monitor the analytics information with respect to the particular network slice, a modified capacity threshold with respect to the particular network slice;

identifying that the modified capacity threshold is exceeded; and based on identifying that the modified capacity threshold is exceeded, performing at least one of:

selecting one or more User Equipment ("UEs") for which access to the particular network slice is to be revoked, or selecting one or more protocol data unit ("PDU") sessions, associated with the particular network slice, to remove.

15. The method of claim 14, wherein determining the capacity threshold for the particular network slice, receiving the request for access to the particular network slice, determining whether to accept or deny the request, and outputting the indication are performed by a Network Slice Admission Control Function ("NSACF") of the wireless network.

16. The method of claim 14, wherein the request is received via an Nnsacf Service-Based Interface ("SBI").

17. The method of claim 14, wherein monitoring the analytics information includes receiving the analytics information from a Network Data Analytics Function ("NWDAF") of the wireless network.

18. The method of claim 14, wherein the capacity threshold includes at least one of:

a threshold quantity of User Equipment ("UEs") that are allowed to access the particular network slice, or a threshold quantity of protocol data unit ("PDU") sessions, associated with the particular network slice, that are allowed to be established.

19. The method of claim 14, wherein the request is received from an Access and Mobility Management Function ("AMF") of the wireless network, wherein the AMF selectively indicates, to a User Equipment ("UE"), whether the UE is authorized to access the particular network slice based on the indication.

20. The method of claim 14, further comprising:

receiving a request to further modify the capacity threshold for the particular network slice; and further modifying the capacity threshold for the particular network slice based on the request.

* * * * *